United States Patent [19]

Boardman et al.

[11] Patent Number: 5,440,419
[45] Date of Patent: Aug. 8, 1995

[54] READ-WRITE HEAD FOR AN OPTICAL TAPE RECORDER

[75] Inventors: John D. Boardman, Garland; Scott M. Hamilton, Rockwall; Jeffrey P. Welch, Plano, all of Tex.

[73] Assignee: E-Systems, Inc., Dallas, Tex.

[21] Appl. No.: 49,377

[22] Filed: Apr. 21, 1993

Related U.S. Application Data

[63] Continuation of Ser. No. 873,029, Apr. 24, 1992, Pat. No. 5,216,534.

[51] Int. Cl.⁶ .............................................. G02B 26/08
[52] U.S. Cl. .................................. 359/210; 359/642; 359/821
[58] Field of Search ............... 359/821, 649, 209, 210, 359/211, 216, 217, 218, 219, 642, 648; 369/44.18, 44.13

[56] References Cited

U.S. PATENT DOCUMENTS

| | | | |
|---|---|---|---|
| 1,973,203 | 9/1932 | Goldberg . | |
| 3,409,348 | 11/1968 | Annis et al. . | |
| 3,891,794 | 6/1975 | Russell | 369/48 |
| 4,090,031 | 5/1978 | Russell | 369/284 |
| 4,163,600 | 8/1979 | Russell | 359/209 |
| 4,273,410 | 6/1981 | Menke | 359/209 |
| 4,320,488 | 3/1982 | Russell | 369/44.18 |
| 4,321,700 | 3/1982 | Russell | 369/44.18 |
| 4,426,696 | 1/1984 | Brenden et al. | 369/112 |
| 4,495,609 | 1/1985 | Russell | 369/44.18 |
| 4,514,055 | 4/1985 | Grant | 359/210 |
| 4,588,254 | 5/1986 | Menke et al. | 359/202 |
| 4,609,259 | 9/1986 | Suemitsu et al. | 156/904 |
| 4,621,892 | 11/1986 | Kataoka | 359/210 |
| 4,640,573 | 2/1987 | Kataoka et al. | 359/210 |
| 4,689,291 | 8/1987 | Popovic et al. | 430/321 |
| 4,737,447 | 4/1988 | Suzuki et al. | 430/321 |
| 4,844,568 | 7/1989 | Suzuki et al. | 359/210 |
| 5,081,617 | 1/1992 | Gelbart | 369/112 |
| 5,159,483 | 10/1992 | Watanabe et al. | 359/210 |
| 5,216,534 | 6/1993 | Boardman et al. | 359/209 |

OTHER PUBLICATIONS

Jahns, Jurgen and Susan J. Walker. "Two-Dimensional Array of Diffractive Microlenses Fabricated by Thin Film Deposition." *Applied Optics* 29.7 (1990): 931–36.

Buralli, Dale A., G. Michael Morris, and John R. Rogers. "Optical Performance of Holographic Kinoforms." *Applied Optics* 28.5 (1989): 976–83.

Flood, Kevin M. and J. Michael Finian. "Multiple Phase Level Computer–Generated Holograms Etched in Fused Silica." *SPIE* 1052 (1989): 91–6.

S. R. Perera et al. "Optical Data Storage Topical Meeting." *SPIE* 1078 (1989): 94–6.

Begley, David L., W. L. Casey, and D. W. Martin. "Aperture Shared Laser Diode Array Beam Combiner." *Applied Optics* 27.13 (1988): 2685–87.

(List continued on next page.)

*Primary Examiner*—Loha Ben
*Assistant Examiner*—Thomas Robbins
*Attorney, Agent, or Firm*—Harold E. Meier

[57] ABSTRACT

The present invention provides a read-write head for an optical tape recorder comprised of a synchronized scanning transmissive polygon and rotating lens wheel. The transmissive polygon is a multi-sided piece of transparent optical quality material for displacing a through transmitted collimated read or write light beam. The lens wheel comprises a unitary disk-shaped piece of optical quality material having a plurality of individual lenses precision molded or diamond point turned therein for focusing the through transmitted and displaced read or write light beam onto a recording media. The polygon is rotated to translate the displaced beam for scanning along a linear path aligned with an arcuate path followed each successive lens on the rotating lens wheel. The rotation of the polygon and lens wheel are synchronized such that each scan of the displaced beam along the linear path coincides with the movement of a lens along the arcuate path to trace out a data track on the recording media. A pair of beam expanders are also provided in the read-write head as a demagnification-magnification system around the transmissive polygon to improve system performance by narrowing the diameter of the beam transmitted through the polygon.

13 Claims, 3 Drawing Sheets

OTHER PUBLICATIONS

Mansuripur, Masud. "Analysis of Astigmatic Focusing and Push–Pull Tracking Error Signals in Magnetooptical Disk Systems." *Applied Optics* 26.18 (1987): 3981∝86.

Cheo, Peter K. *Fiber Optics Devices and Systems.* Englewood Cliffs: Prentice Hall, 1985.

Timoshenko, S. and J. N. Goodier. *Theory of Elasticity.* New York: McGraw–Hill, 1951.

Schott Glass Technologies Inc. "Optical Glass." 16–8, 1987.

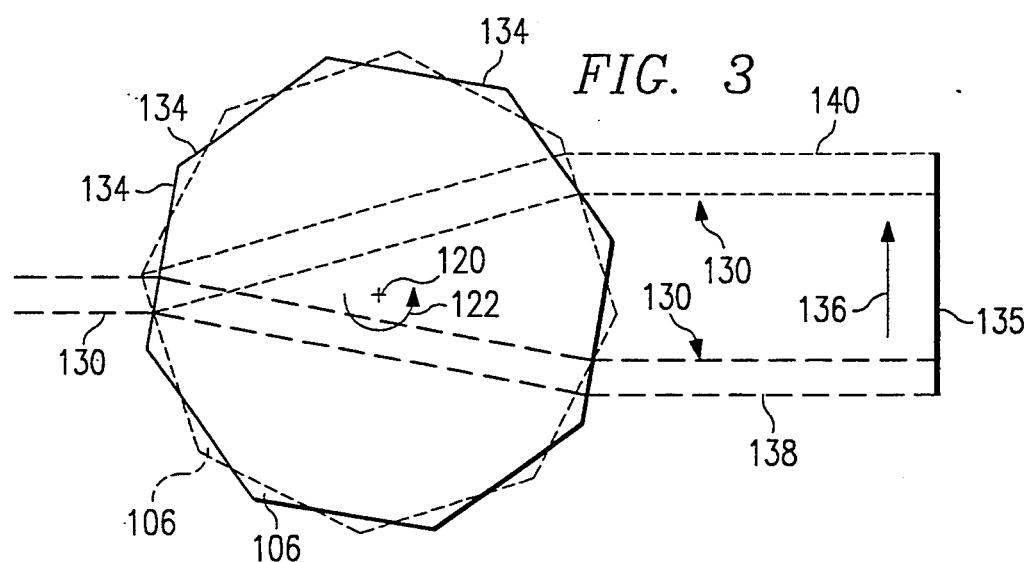
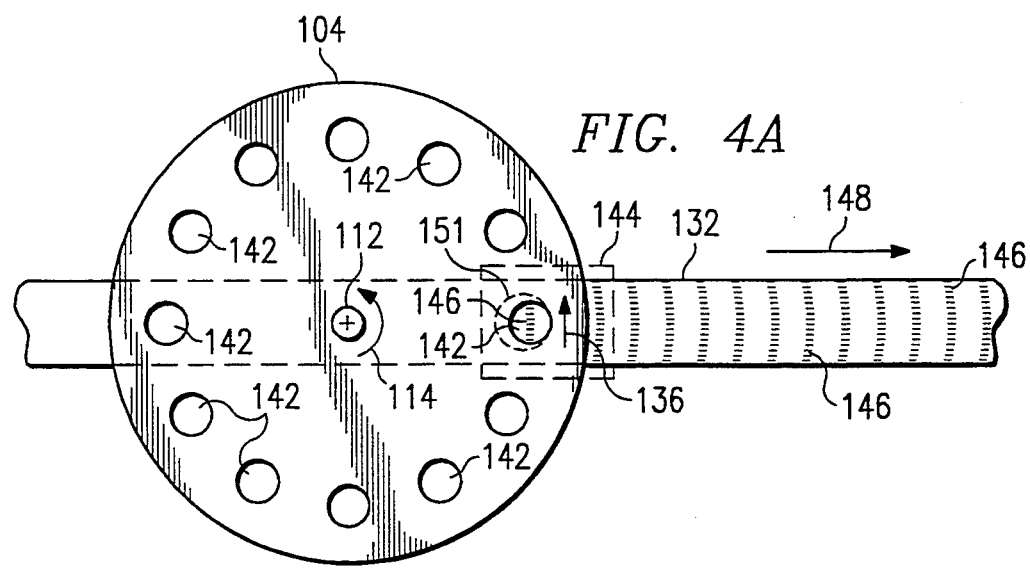
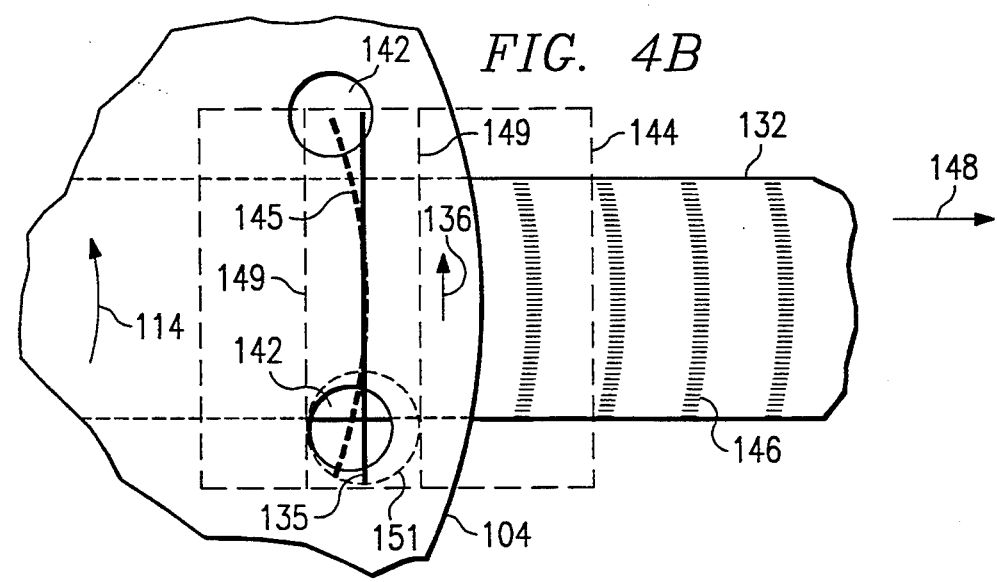

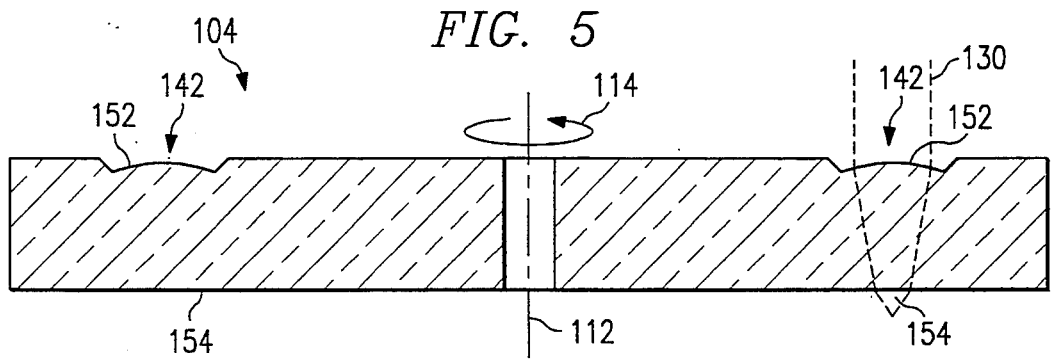
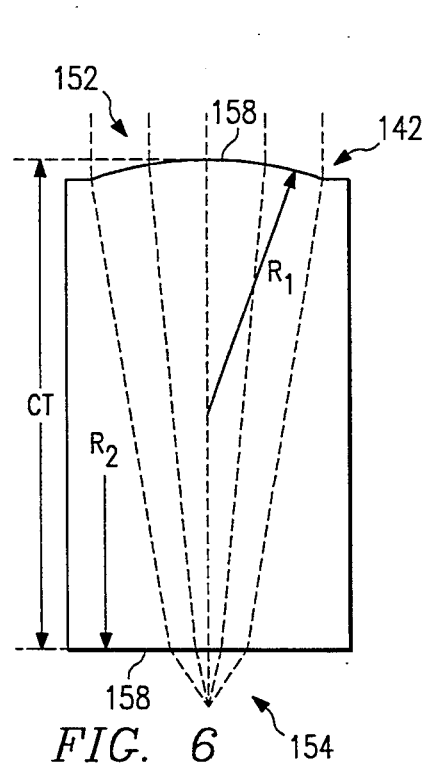
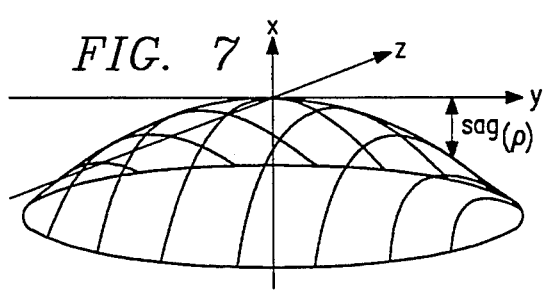
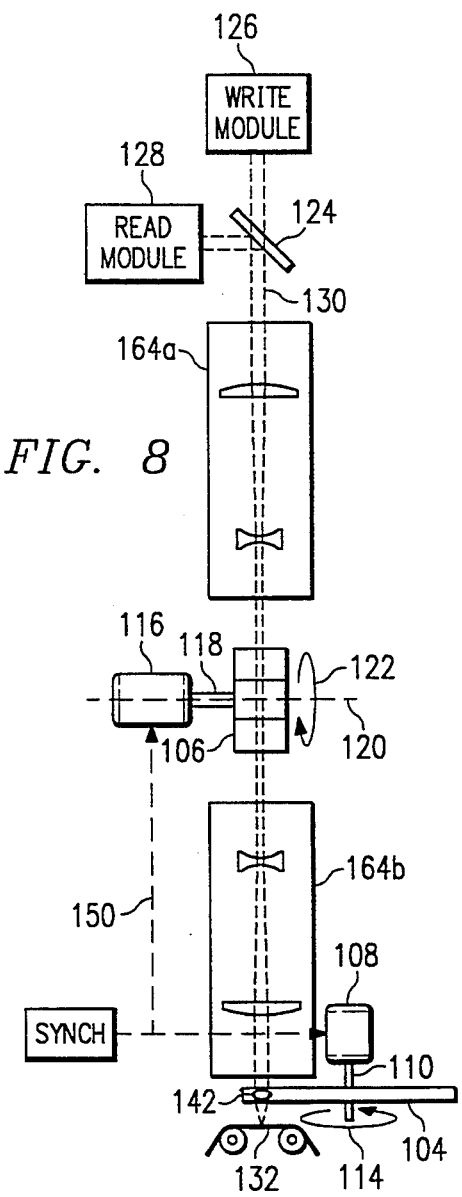

READ-WRITE HEAD FOR AN OPTICAL TAPE RECORDER

This is a continuation of application Ser. No. 07/873,029 filed Apr. 24, 1992 now U.S. Pat. No. 5,216,534.

TECHNICAL FIELD

The present invention relates to optical tape recorders and, in particular, to a read-write head for an optical tape recorder comprised of a synchronized scanning transmissive polygon and rotating lens wheel.

BACKGROUND OF THE INVENTION

Lens wheels (also known as lens-on-disc optical scanners) are used in a variety of optical systems for scanning a focused beam of light across a media to trace out data tracks. A lens wheel is generally comprised of a disk-shaped substrate having a plurality of focusing lenses positioned about the circumference of the disc. In an optical tape recorder system, for example, the lens wheel is rotated about its center such that a collimated beam of light, modulated by the data to be recorded and directed at the rotating wheel, successively illuminates each circumferentially moving lens. Each illuminated lens on the lens wheel focuses the modulated illuminating beam onto the recording media to trace out one data track. Movement of the tape recording media in a direction perpendicular to the data track tracing action causes parallel data tracks to be traced onto the media by the rotating lens wheel to record the data. The lens wheel is also used to recover the recorded data by focusing an illuminating beam to read the data tracks previously recorded from the media with the recorded data modulating and reflecting the illuminating beam back through the rotating lens wheel to a detector.

Several different methods have been used to manufacture lens wheels. For example, one common method utilizes individual lens elements of identical design inserted and secured in openings around the circumference of a disk-shaped substrate. The drawback of this manufacturing method is that the optical performance of each lens in the wheel differs slightly even though the lens designs are identical. The difference in performance is due to the fact that there are differences in back focal distance between the lenses as installed in the disk. Furthermore, some lenses include aberrations or slight defects that, while within the design tolerance for the lenses, are not consistently present across all lenses. Thus, the write paths traced by each lens slightly differ, adversely affecting the performance of the optical system. In optical recording and playback applications involving very high data transmission rates, slight deviations in the traced write paths cannot be tolerated due to the close proximity with which the data tracks must be written to record high data volumes.

In order to increase the data storage capacity of the tape, not only must the data tracks be written close together, but the diameter of each recorded bit must be as small as possible. To achieve a small, high resolution bit diameter, the collimated beam illuminating each write lens on the rotating lens wheel must have a diameter large enough to fully illuminate the write lens as it moves across the recording media. The most common means used for fully illuminating successive write lenses on the rotating lens wheel is flood illumination of an area on the rotating lens wheel. The most common flood illumination pattern provides an elliptical illumination area having a major axis substantially corresponding to an arcuate portion of the circumferential path followed by each write lens while passing across the width of the recording media. With elliptical illumination, however, the illumination efficiency of the beam along the major axis corresponding to the arcuate path of movement of each lens across the media is not constant. Thus, complex and costly electronics are required for adjusting the illumination power of the beam as a function of lens wheel rotation to account for the differences in illumination efficiency as each write lens moves through the elliptical illumination area to trace out a data track. Furthermore, since the illumination area is much larger than the lens clear aperture, flood illumination is inefficient.

In view of the foregoing, there is a need for an improved lens wheel design and manufacturing method that will repeatedly produce lens wheels having similar performance characteristics. Furthermore, there is a need for a more efficient method for illuminating each successive write lens as the lens wheel rotates to trace out a data track.

SUMMARY OF THE INVENTION

To address the performance limitations and other drawbacks associated with conventional lens wheel manufacturing and read-write head flood illumination methods, the present invention provides a read-write head for an optical tape recorder comprised of a synchronized scanning transmissive polygon and rotating precision molded unitary lens wheel. The transmissive polygon is a multi-sided piece of transparent optical quality material that displaces a collimated beam of light parallel to the path of the incident beam. The lens wheel is comprised precision molded disk-shaped piece of optical quality material having a plurality of individual lenses precision molded therein and positioned about the circumference of the lens wheel disk for focusing the displaced collimated beam.

Rotation of the polygon about its axis causes the displaced beam of light to translate and repeatedly scan along a linear path. Rotation of the lens wheel about its center causes each lens to successively follow a portion of the circumferential path of rotation along an arcuate path through an active area with each lens successively focusing an incident illuminating beam, transmitted from the scanning polygon, onto the recording media to trace out a data track. The linear and arcuate paths through the active area are substantially aligned and the rotation of the scanning polygon and lens wheel is synchronized such that each scan of the translated illuminating beam of light along the linear path coincides with the movement of successive individual lenses on the lens wheel along the arcuate path. The successive lenses illuminated by the light beam focus the beam onto the recording media to trace out successive data tracks.

With the read-write head of the present invention, the inefficient flood illumination method of the prior art is obviated as the scanning transmissive polygon moves the illumination beam in synchronization with the rotation of the lens wheel to efficiently illuminate successive write lenses and trace out data tracks on the recording media. Furthermore, use of precision molding or diamond point turning to fabricate a unitary lens wheel from a single piece of optical quality material provides more accurate and consistent lenses for focusing the collimated light beam, as translated by the scanning polygon, onto the recording media. The unitary, precision molded lens wheel utilized in the present invention may also be manufactured less expensively and reproduced more consistently than prior art lens wheels.

BRIEF DESCRIPTION OF THE DRAWINGS

A more complete understanding of the read-write head for an optical tape recorder of the present invention may be had by reference to the Detailed Description in conjunction with the accompanying Drawings wherein:

FIG. 3 is a schematic view of the scanning transmissive polygon of the present invention showing the displacement and translation of the collimated light beam by opposed pairs of polygon sides;

FIG. 4A is a view of the lens wheel of the present invention showing the illumination of a moving lens on the rotating lens wheel by the collimated light beam translated by the scanning polygon;

FIG. 4B is a close-up front view of a portion of the lens wheel as in FIG. 4A showing the synchronized paths of movement of the translated illumination beam and lenses on the rotating lens wheel;

FIG. 5 is a cross sectional view of the unitary lens wheel of the present invention;

FIG. 6 is a cross sectional view of an individual plano-convex singlet lens used in the lens wheel;

FIG. 7 shows the geometry of an aspheric surface for the convex surface of the singlet lens in FIG. 6; and FIG. 8 is a schematic view of the recorder shown in FIG. 2 including a pair of opposed beam expanders for insert on opposite sides of the scanning transmissive polygon in the read-write head of the present invention.

DETAILED DESCRIPTION OF THE DRAWINGS

Figure 1A:
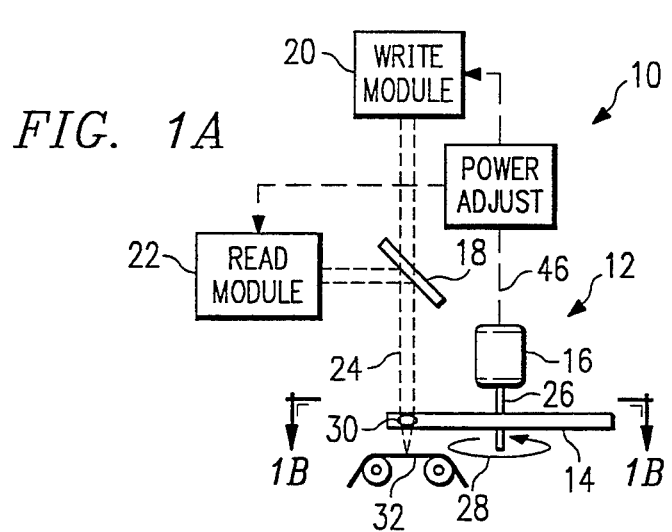
FIG. 1A is a schematic view of an optical tape recorder with a read-write head utilizing a conventional flood illuminated lens wheel and an adjustable power collimated light beam.

Referring now to FIG. 1A, there is shown a schematic view of an optical tape recorder system 10, including a read-write head 12. The read-write head 12 is comprised of a conventional lens wheel 14 and a motor 16. The optical tape recorder 10 further includes a beam splitter 18, a write module 20 and a read module 22. Each module includes an adjustable power laser or other source (neither shown) for emitting a collimated beam of light 24. The read module 22 further includes means for receiving (not shown) the collimated beam 24 as reflected from the recording media 32 to recover recorded data. The emitted collimated beam of light 24 is directed toward the rotating lens wheel 14. Lenses 30, positioned about the circumference of the wheel (FIG. 1B), receive and focus the illuminating collimated beam of light 24 onto the recording media 32. Motor 16 turns shaft 26 which in turn causes the lens wheel 14 to rotate in the direction shown by arrow 28. Rotation of the lens wheel causes successive lenses 30 to be illuminated and focus the collimated beam 24 to trace out data tracks on the recording media 32 in a manner well known.

The collimated beam of light 24 illuminating the lens wheel 14 can either be a write beam or a read beam. If it is a write beam, the write module 20 modulates the beam 24 with the digital data to be recorded on the media 32. The beam 24, as modulated by the data, is focused by the lenses 30 of the rotating lens wheel 14 on the media 32 to record the data. If the beam 24 is a read beam, the digital data as recorded on the media 32 modulates the light beam 24 transmitted by the read module 22 for reflection back to the read module through beam splitter 18. The read module 22 then recovers the recorded data from the reflected and modulated beam for playback.

Figure 1B:
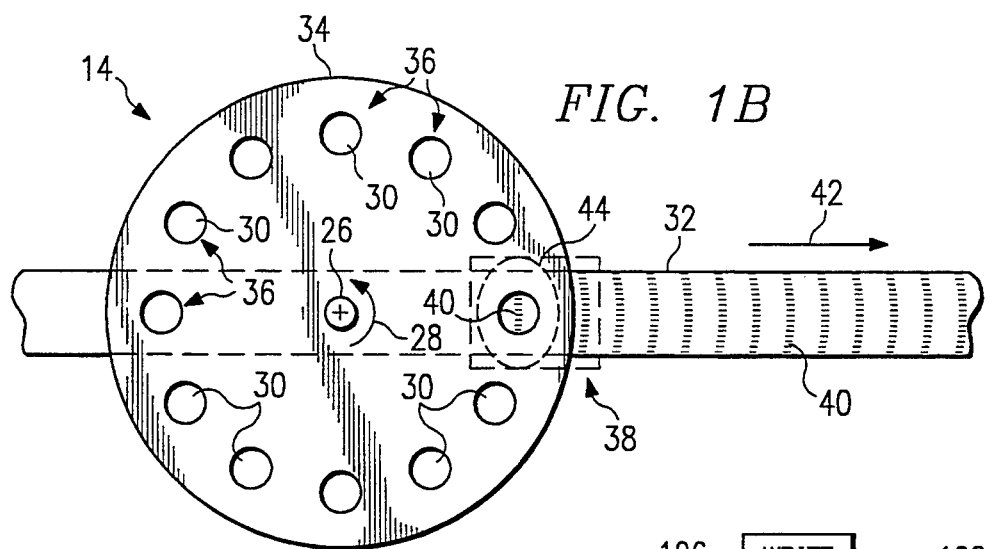
FIG. 1B is a view of the lens wheel showing a conventional elliptical flood illumination pattern for the collimated light beam.

Referring now to FIG. 1B, the conventional lens wheel 14 is comprised of a disk-shaped supporting substrate 34 and a plurality of individual lenses 30 positioned with equal spacing about the circumference of the lens wheel. Each lens 30 is typically comprised of one or more separate elements secured with an adhesive or other mounting means within an opening 36 in the substrate 34. As the lens wheel 14 is rotated by the motor 16 (FIG. 1A) in the direction indicated by arrow 28, successive individual lenses 30 pass through an active area 38, generally corresponding to the location of the recording media 32, to focus the collimated beam and trace out a data track 40. With movement of the recording media 32 in a direction (shown by arrow 42) perpendicular to the direction traced by each data track 40 according to the rotation of the lens wheel 14 (shown by arrow 28), the lenses 30 of the rotating lens wheel trace out successive parallel data tracks on the recording media.

To achieve the smallest possible bit diameter for a data track 40 on the recording media 32, each lens 30 moving through the active area 38 is illuminated with a collimated beam having a diameter at least as large as the diameter of the lens. Utilizing a conventional illumination technique, the active area 38 of the lens wheel 14 is flood illuminated by the collimated beam to fully illuminate the lens 30 during movement through the active area 38. The most common flood illumination pattern is an elliptical illumination area, as generally shown at 44, having a major axis substantially corresponding, in the active area 38, to a portion of the arcuate path of movement through the active area followed by each lens 30 on the rotating lens wheel 14. With an elliptical illumination area 44, however, the illumination efficiency along the major axis is not constant. Thus, complex and costly electronics are required to adjust the power of the illumination beam 24, in accordance with the rotation of the lens wheel as generally indicated at 46, as each lens 30 moves through the active area 38.

Figure 2:
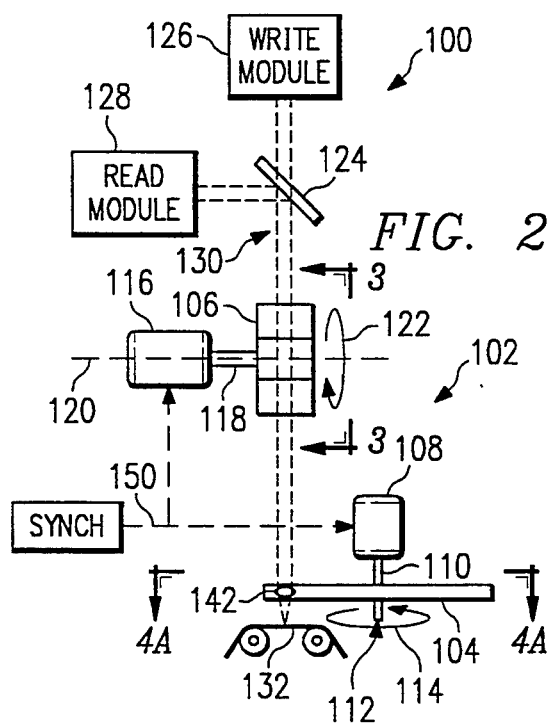
FIG. 2 is a schematic view of an optical tape recorder with a read-write head according to the present invention.

Referring now to FIG. 2, there is shown a schematic view of an optical tape recorder 100 utilizing a read-write head 102 according to the present invention. The read-write head 102 is comprised of a synchronized rotating lens wheel 104 and scanning transmissive polygon 106. The lens wheel 104 further includes a motor 108 turning a shaft 110 for rotating the lens wheel about an axis of rotation 112 in the direction indicated by arrow 114. The scanning transmissive polygon 106 further includes a motor 116 turning a shaft 118 for rotating the polygon about an axis of rotation 120 in the direction indicated by arrow 122.

The optical tape recorder 100 further includes a beam splitter 124, a write module 126 and a read module 128. Each module includes a laser or other source (neither shown) for emitting a collimated beam of light 130 that may either be a write beam or a read beam in accordance with the designated function of the module. If the beam 130 is a write beam, the write module 126 modulates the beam with the digital data in a manner well known for output to be recorded by the read-write head 102 on a recording media 132. If the beam 130 is a read beam, the digital data recorded on the media 132 modulates the transmitted light beam for reflection back to the read module through beam splitter 124. The read module 128 then recovers the recorded data from the reflected and modulated beam 130 for playback.

For purposes of either writing or reading data, the emitted collimated beam of light 130 is directed from either the write module 126 or read module 128 via the splitter 124 toward the scanning transmissive polygon 106. Referring now to FIG. 3, there is shown a schematic view of the scanning transmissive polygon 106. The polygon 106 is comprised of a piece of optical quality transparent material having an even number of sides 134 arranged in opposed parallel pairs. The polygon 106 is oriented with respect to the received collimated beam of light 130 such that the beam will be transmitted through the polygon and be refracted by one of the opposed pairs of parallel sides 134.

Refraction by opposed parallel sides 134 causes the collimated beam 130 received by and transmitted through the polygon to be displaced parallel to the path of the received beam. Rotation of the polygon 106 about axis 120 (in the direction shown by arrow 122) causes the through transmitted and displaced beam to translate and repeatedly scan, in the direction indicated by arrow 136, along a linear path 135 (shown also in detail as a solid line in FIG. 4B). The displaced beam will scan, as the polygon 106 rotates, along path 135 from a first position, generally indicated by the output beam 138 for the solid line polygon, to a second position, generally indicated by the output beam 140 for the dashed line polygon. One scan of the beam along the path 135 occurs for each opposed pair of parallel sides 134 refracting the through transmitted beam 130 while the polygon 106 rotates.

Referring again to FIG. 2, the through transmitted and displaced scanning collimated beam 130 is directed toward the lens wheel 104. Referring now to FIG. 4A, there is shown a front view of the lens wheel of the present invention. The lens wheel 104 has a disk shape and is comprised of a plurality of individual lenses 142 positioned with equal spacing about the circumference of the disc. The individual lenses 142 successively receive and focus the illuminating collimated beam 130 onto the recording media 132. The lens wheel is preferably a unitarily formed disk-shaped piece of optical quality material having the plurality of lenses 142 precision molded or diamond point turned therein. Each lens 142 may alternatively be manufactured individually, separate and apart from the lens wheel, and inserted and secured within a plurality of openings formed about the circumference of the lens wheel disc. Separate manufacture and installation of individual lenses 142 is not preferred, however, as the unitary lens wheel 104 described above more accurately performs and may be manufactured less expensively and reproduced more consistently.

As the lens wheel 104 is rotated about axis 112 by the motor 108 (FIG. 2), successive individual lenses 142 about the circumference of the wheel momentarily focus the collimated beam on the recording media 132. Focusing of the collimated beam 130 by a lens 142 occurs only when the lens momentarily moves through an active area 144 generally corresponding to the location of the recording media 132. Rotation of the lens wheel in the direction shown by arrow 114 causes successive individual lenses to follow an arcuate path 145 (shown in detail as a broken line in FIG. 4B) through the active area 144. The path 145 consists of a portion of the circumferential path followed by the center of each lens 142 of the rotating lens wheel. Each lens 142 passing through the active area 144 focuses the illuminating collimated beam 130 onto the recording media 132 to trace out a data track 146. With movement of the recording media 132 in a direction (shown by arrow 148) perpendicular to the direction traced by each data track 146 and rotation of the lens wheel 104 (shown by arrow 114), successive lenses 142 become active to trace out successive parallel data tracks 146 on the recording media.

The linear path 135 followed by the scanning illumination beam 130 and arcuate path 145 followed by each lens 142 on the rotating lens wheel 104 through the active area 144 are shown superimposed over each other in FIG. 4B. These paths are substantially aligned with each other, with slight deviations therebetween caused by the lens path 145 being arcuate and the scan path 135 being linear. The beam 130 (shown illuminating a circular area 151 on the lens wheel that is slightly larger than the diameter of a lens 142) illuminates a portion of the active area 144, while scanning along path 135, between the broken lines 149. The area between broken lines 149 scanned by the beam 130 along path 135 will fully illuminate each lens 142 moving along path 145 as the lens wheel 104 rotates to trace out successive parallel data tracks 146 if the position of the paths are substantially aligned (as shown in FIG. 4B) and the movement of each scan of the beam 130 along path 135 is synchronized with the movement of each successive lens along path 145 such that the movement of beam 130 and lens 142 coincide during the period each successive lens moves through the active area 144.

Referring now to FIGS. 2, 3, 4A and 4B, in order for the linear movement of each scan of the collated beam 130 output from the transmissive polygon 106 across the active area 144 to coincide with the arcuate movement of each successive lens 142 through the active area, the rotation of the scanning transmissive polygon and lens wheel 104 are synchronized, as generally indicated at 150. With synchronization, one scan of the collated beam 130 along linear path 135 will occur for and correspond with the movement of each lens 142 through the active area 144 along arcuate path 145. As the collimated beam 130 presents a circular illumination area 151 that is only slightly larger than the diameter of the write lens 142, synchronization insures the movement of beam and lens to properly coincide to fully illuminate the lens thereby achieving the smallest possible diameter on the recording media 132 for each data track 146 while maximizing lens illumination efficiency.

Referring now to FIG. 5, there is shown a crosssectional view of the unitary lens wheel 104 of the present invention having a plurality of lenses 142 positioned about the circumference of a disk-shaped body. The preferred optical lens design for each lens 142 in the lens wheel 104 is a plano-convex singlet having an aspheric figure on the convex side 152 (see also FIG. 6). The use of a planar surface 154 in conjunction with a convex powered surface 152 provides for a less complex lens design by removing the alignment tolerances associated with centering two powered surfaces together (as in a double-convex or concave-convex design). The plano-convex design is further preferred because the design minimizes the wedge between included optical surfaces in the lens and the planar surface provides a useful reference flat. Thus, the plano-convex design using a convex surface 152 coupled to a planar surface 154 provides for easier, less expensive and more efficient fabrication, testing and assembly of the lens wheel 104.

With a lens design where one surface (the aspheric surface 152) provides the majority of the focusing power, an optical material with a refractive index exceeding 2.25 (for example, "Cleartran" zinc sulfide) is preferably used for fabricating each lens 142. In the preferred embodiment, the entire lens wheel 104, including the disc support structure and the individual lenses, is unitarily fabricated from the highly refractive optical quality material using precision molding or diamond point turning techniques. Precision molding or diamond point turning of the individual lenses 142 with the disk substrate of the lens wheel forms a unitary lens wheel 104 (as shown in FIG. 5) possessing the advantages of being accurate, reproducible and interchangeable. In the alternative, after individual fabrication of each lens 142 from the preferred optical material and in accordance with the lens design specified herein, regardless of whether individual lenses are molded or diamond point turned, the lenses are inserted and secured in one of a plurality of openings around the circumference of the disk-shaped lens wheel 104 in accordance with the teachings of the prior art.

Referring now to FIG. 6, there is shown a cross sectional view of the geometry of the plano-convex singlet lens 142 as precision molded or diamond point turned into the unitary lens wheel or manufactured separately and inserted within each opening in the circumference of a lens wheel disc. The parameters that define the plano-convex optical lens design are the radius of the convex surface ($R_1$), the radius of the planar surface ($R_2$), the center thickness (CT) between the vertices 158 of the first and second surfaces, the conic and aspheric coefficients for each surface, the clear aperture diameter for each surface and the type of lens material. As discussed above, the type of lens material preferred for each lens 142 of the lens wheel 104 is "Cleartran" zinc sulfide. Any other optical quality material having a refractive index exceeding 2.25 over a spectral region from 0.4 to 1.2 micrometers may be substituted for zinc sulfide. The convex surface 152 of the lens is a convex asphere having a radius of $R_1$, a conic constant $k_1$, and four aspheric coefficients $ad_1$, $ae_1$, $af_1$ and $ag_1$. The planar surface 154 of the lens has a radius of $R_2$ and zero values for the conic constant $k_2$, and the four aspheric coefficients $ad_2$, $ae_2$, $af_2$ and $ag_2$.

Conventionally, the lens design parameters for lenses used in prior art lens wheels were evaluated according to a constant limiting the lens to operation at a single wavelength for the collimated beam 130 emitted by the read and write modules of the optical recorder. It is, however, desirable for a lens 142 in an optical tape recorder to function across a broad wavelength region, rather than a single operating wavelength, because of the availability of a wide choice of interchangeable laser sources having different operating wavelengths. Thus, in the present invention, the surface radii, the conic constants and aspheric coefficients of the chosen plano-convex singlet lens design for the lens wheel are evaluated as a function of a range of predetermined operating wavelengths. This insures that an optimum lens design is chosen to operate with a plurality of available laser sources to provide a Strehl ratio exceeding ninety-five percent across a specified frequency range.

The aspheric figure of the convex surface 152 of the singlet lens 142 in FIGS. 5 and 6 is defined, according to the geometry shown in FIG. 7, by the following sag equation:

$$\text{sag}(\rho) = \frac{CV \rho^2}{1 + \sqrt{1 - (k-1) CV^2 \rho^2}} + ad\rho^4 + ae\rho^6 + af\rho^8 + ag\rho^{10}$$

wherein: $CV = 1/R_1$, $$\rho = \sqrt{z^2 + y^2},$$

x is along the optical axis, and
y and z are transverse coordinates in the plane orthogonal to the optical axis.

(CT), the conic constants (k) or the aspheric coefficients (ad, de, af or ag) of the chosen lens design, may be approximated by a sixth order polynomial dependent upon wavelength ($\lambda$) as given by:

$$s = \left[ \sum_{j=0}^{6} a_j \lambda^j \right]$$

wherein: $a_j$ is the jth order coefficient of the polynomial. Table 1 herein gives the 6th order polynomial coefficients for each lens design parameter for the plano-convex singlet utilized in the lens wheel of the present invention. The only parameters that remain constant are the clear aperture diameter and the type of lens material. Through use of the sixth order coefficients given in Table 1 and the polynomial above, the lens parameters s are selectively chosen as a function of wavelength to provide a lens for operation over a predetermined broad wavelength region. This expands the functionality and adaptability of the lens design and lens wheel operation by enabling the substitution of laser sources and lens wheels into the recorder.

As mentioned above, the lens wheel 104 used in the read-write head of the present invention is a disk shape unitarily formed from an optical quality material using precision molding or diamond point turning techniques. If precision molding techniques are employed, a master lens wheel that is essentially a negative of the optical surface desired on the lens wheel is used to form the lens wheel. To fabricate the lens wheel 104 from the master, a high quality optical polymer or specially formulated glass is precision molded in accordance with the shape of the master. In the alternative, a flat high quality optical substrate serves as a base for deposition of a thin epoxy layer, with the master molding the lenses into the epoxy to fabricate the wheel.

If refractive optics are to be used for each individual lens 142 on the lens wheel 104, the master is created using conventional diamond turning and polishing techniques. If diffractive optics are to be used, either lithography or diamond turning are used to create the master. Diffractive lenses are typically modelled and fabricated as either kinoforms or binary lenses. A fresnel lens is a specific type of kinoform. The smooth surfaces of kinoforms are approximated using flat surfaces and step functions (binary optics). Flat surface approximated kinoforms are manufactured using diamond turning techniques. Binary optics are manufactured using either photolithography or electron beam lithography by iteratively masking and etching a substrate. Once the lens type (refractive or diffractive) and manufacturing method are determined, the master is fabricated according to the preferred method. A plurality of lens wheels are then manufactured from the master using precision molding with the resulting lens wheels being substantially identical, interchangeable and functional over a broad wavelength range. The lenses also have substantially identical back focal distances, and any aberrations due to lens design are consistently present across all lenses on the wheel.

Referring again to FIG. 3, for several mechanical and optical performance optimization reasons that will be discussed, the number of opposed pairs of sides 134 for the polygon 106 should be maximized (as a function of resulting increases in manufacturing complexity and cost). One benefit obtained from increasing the number of opposed sides 134 is that the polygon 106 more closely resembles a disk thereby decreasing the effects of windage as the polygon rotates. Furthermore, an increase in the number of opposed sides 134 decreases the rotational velocity of the polygon 106 required for a fixed rotational speed of the lens wheel 104. This is important because high rotational velocities of the polygon 106 load the motor 116 and induce optical birefringence in some optical materials chosen for fabrication of the polygon. Finally, increasing the number of opposed sides 134 of the polygon 106 decreases the maximum angle of incidence of the collimated beam 130. This reduces variations in fresnel reflection coefficients and enables the use of both s- and p-polarized light for the collimated beam 130 (thereby increasing recorder bandwidth).

Referring now to FIG. 8, the read-write head 102 of the optical tape recorder 100 of the present invention (see FIG. 2) is shown further including a pair of beam expanders 164 positioned along the illuminating beam 130 on opposite sides of the scanning transmissive polygon 106. Beam expander 164a is located between the scanning polygon 106 and the beam splitter 124. Beam expander 164b is located between the scanning polygon 106 and the lens wheel 104. The use of a pair of beam expanders 164 provides a demagnification-magnification system around the polygon 106 that narrows the diameter of the beam incident on and transmitted through the polygon and expands the diameter of the beam output from the polygon.

With a smaller diameter beam transmitted through the polygon, the size and shape of the polygon may be scaled as desired in accordance with manufacturing complexity and cost concerns while realizing the mechanical and optical performance benefits of an increased number of sides as discussed above. A further benefit from scaling the size of the polygon is a less stringent manufacturing specification for the parallelism of opposing sides 134 causing a corresponding decrease in polygon manufacturing costs. Furthermore, by narrowing the diameter of the collimated beam 130 transmitted through the scanning polygon 106, the duty cycle of the system is increased.

Although several embodiments of the read-write head for an optical tape recorder have been described in the foregoing Detailed Description and illustrated in the accompanying Drawings, it will be understood that the invention is not limited to the embodiments disclosed, but is capable of numerous rearrangements, substitutions and modifications without departing from the spirit of the invention.

TABLE 1

|  | $a_0$ | $a_1$ | $a_2$ | $a_3$ |
|---|---|---|---|---|
| $R_1$ | $4.273 \times 10^1$ | $-2.370 \times 10^{-1}$ | $1.000 \times 10^{-3}$ | $-1.053 \times 10^{-6}$ |
| CT | $5.020 \times 10^1$ | $-2.480 \times 10^{-1}$ | $1.000 \times 10^{-3}$ | $-9.821 \times 10^{-7}$ |
| $k_1$ | $-2.591 \times 10^1$ | $1.530 \times 10^{-1}$ | 0 | $6.286 \times 10^{-7}$ |
| $ad_1$ | $-2.000 \times 10^{-3}$ | $2.353 \times 10^{-5}$ | $-7.487 \times 10^{-8}$ | $1.280 \times 10^{-10}$ |
| $ae_1$ | $4.445 \times 10^{-5}$ | $-5.113 \times 10^{-7}$ | $1.940 \times 10^{-9}$ | $-3.741 \times 10^{-12}$ |
| $af_1$ | $7.643 \times 10^{-8}$ | $7.448 \times 10^{-9}$ | $-4.057 \times 10^{-11}$ | $9.181 \times 10^{-14}$ |
| $ag_1$ | $-8.316 \times 10^{-8}$ | $4.957 \times 10^{-10}$ | $-1.455 \times 10^{-12}$ | $2.400 \times 10^{-15}$ |

|  | $a_4$ | $a_5$ | $a_6$ |
|---|---|---|---|
| $R_1$ | $9.116 \times 10^{-10}$ | $-4.180 \times 10^{-13}$ | $7.914 \times 10^{-17}$ |
| CT | $8.039 \times 10^{-10}$ | $-3.485 \times 10^{-13}$ | $6.241 \times 10^{-17}$ |
| $k_1$ | $-5.201 \times 10^{-10}$ | $2.279 \times 10^{-13}$ | $-4.131 \times 10^{-17}$ |
| $ad_1$ | $-1.217 \times 10^{-13}$ | $6.044 \times 10^{-17}$ | $-1.224 \times 10^{-20}$ |
| $ae_1$ | $3.870 \times 10^{-15}$ | $-2.046 \times 10^{-18}$ | $4.343 \times 10^{-22}$ |
| $af_1$ | $-1.031 \times 10^{-16}$ | $5.703 \times 10^{-20}$ | $-1.243 \times 10^{-23}$ |
| $ag_1$ | $-2.319 \times 10^{-18}$ | $1.214 \times 10^{-21}$ | $-2.630 \times 10^{-25}$ |

We claim:

1. A rotating lens wheel for the read-write head of an optical recording apparatus, comprising:
   a disk-shaped substrate mounted for rotational movement; and
   a plurality of circumferentially positioned lenses mounted to the disk-shaped substrate wherein each lens comprises a plano-convex singlet having a planar surface and an opposed convex powered surface, the powered surface having an aspheric figure defined according to lens parameters selected as a function of wavelength for operation of the lens over a chosen wavelength range.

2. The rotating lens wheel for the read-write head of an optical recording apparatus as in claim 1 wherein each lens comprises transparent optical quality material having an index of refraction of approximately 2.25 over a preselected range of operating wavelengths.

3. The rotating lens wheel for the read-write head of an optical recording apparatus as in claim 1 wherein the disk-shaped substrate is precision molded from optical quality material to unitarily fabricate the disk-shaped substrate with a plurality of molded lenses positioned about the circumference of the disk.

4. The rotating lens wheel for the read-write head of an optical recording apparatus as in claim 1 wherein each of the lenses is diamond point turned in a disk-shaped substrate positioned about the circumference of the disk.

5. The rotating lens wheel for the read-write head of an optical recording apparatus as in claim 1 wherein the disk-shaped substrate comprises a layer of epoxy deposited on one side thereof and a plurality of lenses positioned about the circumference of the disk diamond point turned in the epoxy layer.

6. A rotating lens wheel for the read-write head of an optical recording apparatus, comprising:

a disk-shaped substrate having a plurality of openings positioned about the circumference of the substrate;

a plurality of plano-convex singlet lenses inserted and secured within the plurality of openings wherein each plano-convex singlet has a planar surface and an opposed convex powered surface, the powered surface having an aspheric figure defined according to lens parameters selected as a function of wavelength for operation of the lens over a chosen wavelength range.

7. The rotating lens wheel for the read-write head of an optical recording apparatus as in claim 6 wherein each lens comprises optical quality material having an index of refraction of approximately 2.25 over a preselected range of operating wavelengths.

8. A method for manufacturing a rotating lens wheel for the read-write head of an optical recording apparatus, comprising:

forming a disk-shaped substrate of optical quality material; and diamond point turning each one of a plurality of lenses in the optical quality disk-shaped substrate, the lenses positioned about the circumference of the disk-shaped substrate.

9. The method for manufacturing a rotating lens wheel as in claim 8 wherein each lens comprises a plano-convex singlet having a planar surface and an opposed convex powered surface having an aspheric figure defined according to lens parameters selected as a function of wavelength for operation of the lens over a preselected wavelength range.

10. The method for manufacturing a rotating lens wheel as in claim 8 wherein each lens comprises transparent optical quality material having an index of refraction of approximately 2.25 over a preselected range of operating wavelengths.

11. A method for manufacturing a rotating lens wheel for the read-write head of an optical recording apparatus, comprising:

forming a disk-shaped substrate of optical quality material;

depositing a thin epoxy layer on the disc-shaped substrate; and molding a plurality of lenses into the epoxy layer about the circumference the disk-shaped substrate.

12. The method for manufacturing a rotating lens wheel as in claim 11 wherein each lens comprises a plano-convex singlet having a planar surface and an opposed convex powered surface having an aspheric figure defined according to lens parameters selected as a function of wavelength for operation of the lens over a preselected wavelength range.

13. The method for manufacturing a rotating lens wheel as in claim 11 wherein each lens comprises transparent optical quality material having an index of refraction of approximately 2.25 over a preselected range of operating wavelengths.

* * * * *